United States Patent [19]

Wythe

[11] 3,996,037
[45] Dec. 7, 1976

[54] PASS THROUGH SHEARS FOR MOLTEN GLASS FEEDER

[75] Inventor: Frederick Joseph Wythe, Hebron, Conn.

[73] Assignee: Emhart Industries, Inc., Farmington, Conn.

[22] Filed: June 25, 1975

[21] Appl. No.: 590,394

Related U.S. Application Data

[63] Continuation of Ser. No. 440,863, Feb. 8, 1974, abandoned.

[52] U.S. Cl. .................................... 65/334; 65/133; 65/207; 65/221; 65/225; 83/578; 83/623
[51] Int. Cl.² ...................... C03B 5/38; C03B 5/16; B26D 5/08
[58] Field of Search ............ 65/334, 133, 207, 221; 83/578, 623; 65/225

[56] References Cited

UNITED STATES PATENTS

| 1,174,173 | 3/1916 | Manning | 65/334 X |
|---|---|---|---|
| 1,879,690 | 3/1932 | Kadow et al. | 65/334 X |
| 1,906,650 | 5/1933 | Soubier | 65/334 X |
| 2,271,004 | 1/1942 | Gray | 65/334 X |
| 3,567,418 | 3/1971 | Hoette | 65/334 |

FOREIGN PATENTS OR APPLICATIONS

| 2,137,198 | 2/1973 | Germany |
|---|---|---|

*Primary Examiner*—S. Leon Bashore
*Assistant Examiner*—Frank W. Miga
*Attorney, Agent, or Firm*—McCormick, Paulding & Huber

[57] ABSTRACT

The stream of molten glass which is discharged from the outlet spout of a molten glass feeder is severed to form discrete gobs of glass for delivery to the glassware forming machine. A pair of double edged shear blades move in opposite directions linearly across the stream to cut not only during an initial "pass through" stroke, but also to cut during their return stroke.

7 Claims, 6 Drawing Figures

PASS THROUGH SHEARS FOR MOLTEN GLASS FEEDER

This is a continuation of application Ser. No. 440,863 filed Feb. 8, 1974 now abandoned.

BACKGROUND OF THE INVENTION

Conventional molten glass shears can be characterized as "stop and return" type to distinguish them from "pass through" shears of the type used herein because of the conventional design limitation which dictates that the blades move from an open position to a closed or shearing position, and then return to reopen prior to the next cut.

In PEILER U.S. Pat. No. 2,680,937 issued on June 15, 1954, pivoted shear blades are adapted to move in the foregoing manner, each of the blades being stopped in its closed position, and each blade subsequently returned to its open position prior to the next cut.

In my prior U.S. Pat. No. 3,435,719 issued Apr. 1, 1969, the shear blades move in a straight line path, rather than arcuately as in PEILER, but these blades also stop at a shearing position from which the blades must be returned to an open position prior to the next succeeding cut.

The aim of the present invention then is to provide an improved gob shearing mechanism for use below the outlet spout of a molten glass feeder, which mechanism includes double edged shear blades adapted to cut the glass stream while moving in both a forward and a rearward direction. Higher shearing speeds are thus made possible than could be achieved with prior art shears.

SUMMARY OF THE INVENTION

This invention relates generally to molten glass shears suitable for mounting below a feeder bowl of the type adapted to discharge one or more streams of molten glass. The shear structure of the present invention includes reciprocating blades which are adapted to sever the stream of molten glass and to form discrete gobs of glass for delivery to the various molds of glassware forming machine. More specifically, the shear structure of the present invention includes upper and lower carriages reciprocably mounted on rails for movement in response to extension and retracton of reversible fluid motors or actuators. Control valve means is provided for operating these actuators in a manner similar to that described in my prior U.S Pat. No. 3,435,719. However, the shear blades described herein, move past one another, or more correctly, above and below one another respectively, said blades cutting the molten glass stream at the approximate midpoint of their respective forward and rearward strokes. Thus, the blades of the present invention do not stop or come to a so-called closed, or shearing position, at the end of their strokes as in prior art molten glass shears.

DETAILED DESCRIPTION

Figure 3:
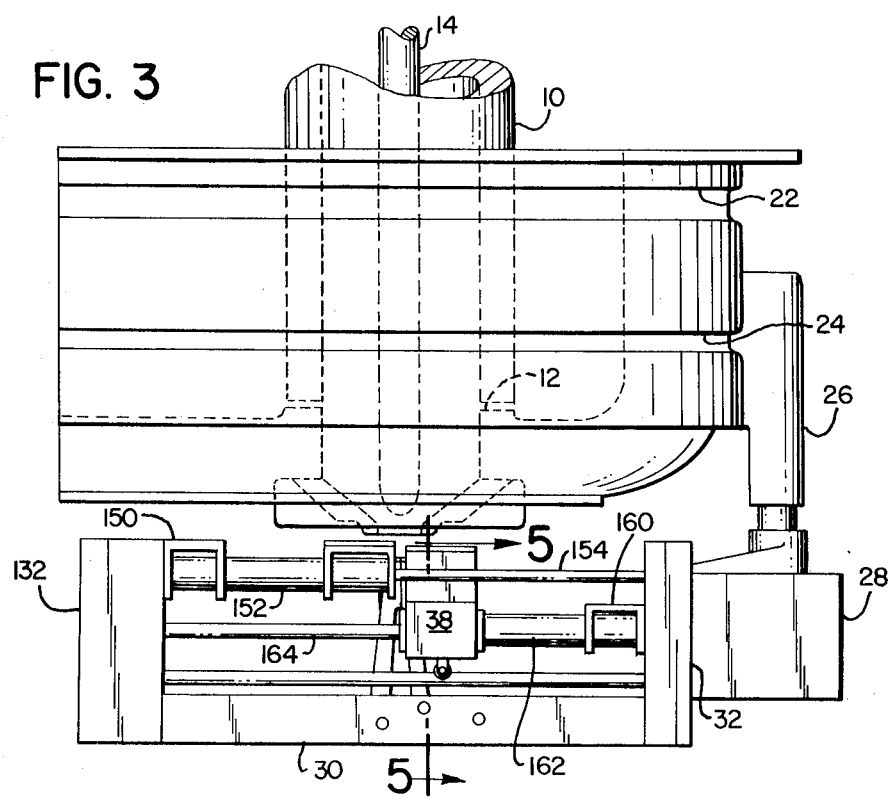
FIG. 3 is an elevational view of the shear structure shown in FIGS. 1 and 2, and also shows the general configuration of a conventional feeder bowl.

Turning now to the drawings in greater detail, and referring more particularly to FIG. 3, a conventional feeder bowl is there shown with molten glass provided in the interior of the bowl, for extrusion through the lower portion, or outlet spout of the feeder bowl, through orifices defined in an orifice plate mounted in said outlet spout. A continuously rotating tube 10 has its lower end spaced above an annular curb 12, defined for this purpose in the feeder bowl, and a vertically reciprocable plunger 14 causes the molten glass in the bowl to be discharged from the orifice or orifices in the lower outlet spout of the feeder bowl in a manner well known in the art.

Figure 1:
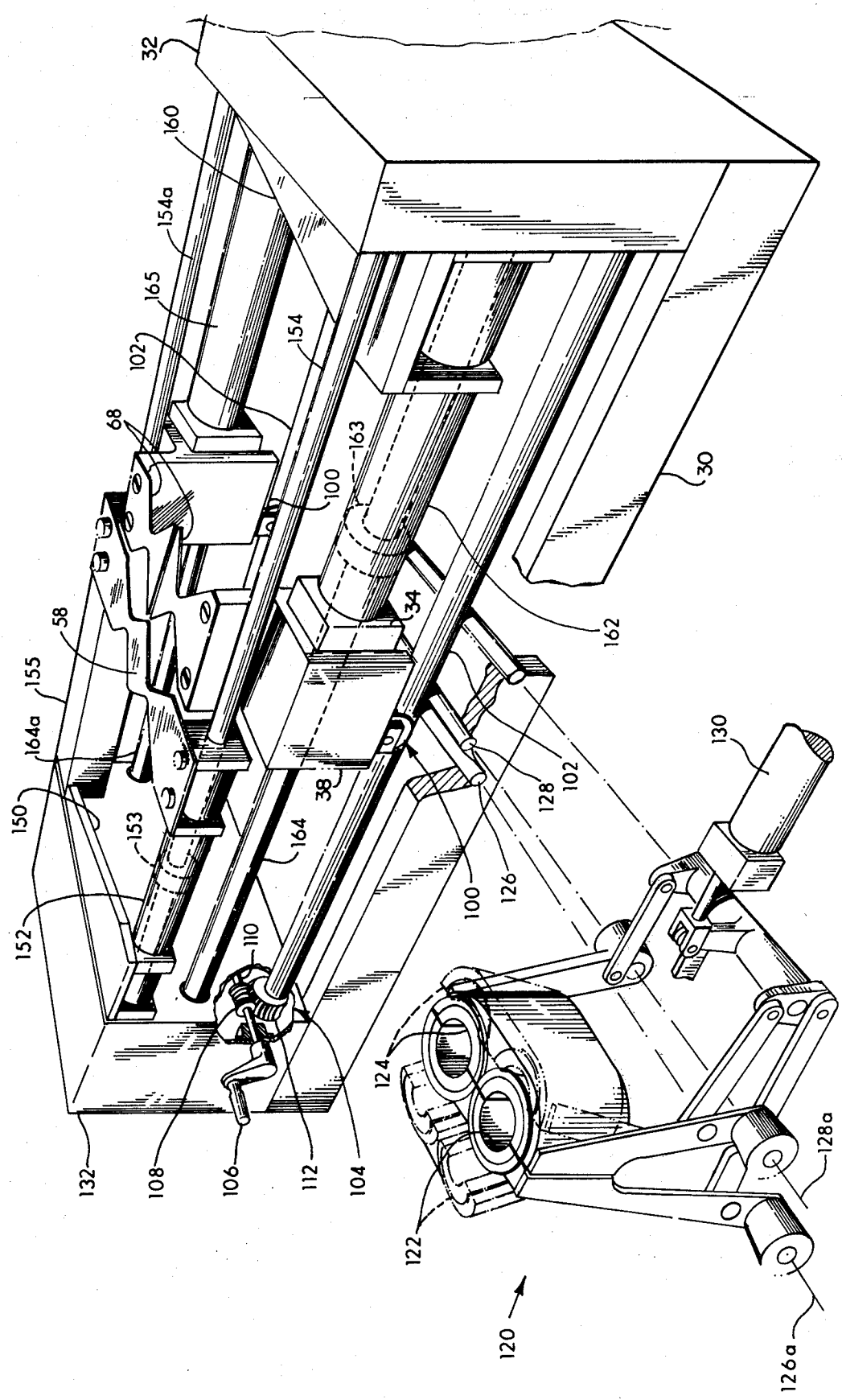
FIG. 1 is a perspective view of a shear structure incorporating the present invention with a a portion of the device being shown in exploded relationship to better reveal its component parts.
Figure 2:
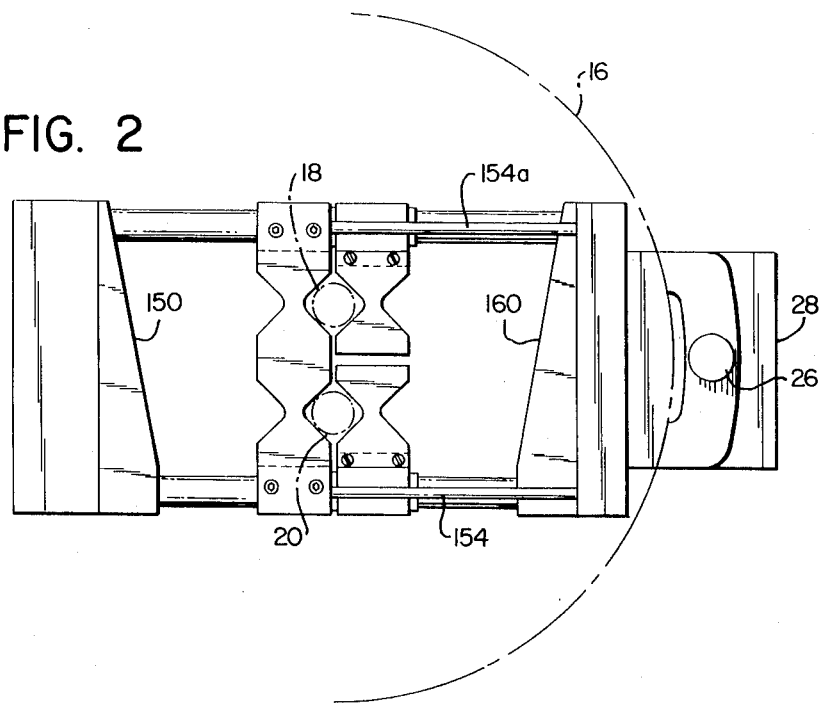
FIG. 2 is a plan view of the shear structure shown in FIG. 1 with the outline or periphery of a double gob molten glass feeder bowl being shown in phantom lines for purposes of reference only, and its two orifices being also indicated in phantom lines.

FIG. 2 shows the relationship between the periphery of the feeder bowl as indicated generally at 16 together with its associated orifices 18 and 20, defined generally centrally with respect to the circular feeder bowl. The bowl 16 together with the orifices 18 and 20 are shown in phantom lines for reference purposes to aid in the description of the shear structure forming the subject matter of the present invention and best shown in FIG. 1.

Still with reference to FIG. 3, the feeder bowl includes annular gibs 22 and 24, to which gibs the shear structure of the present invention is adapted to be mounted. As shown, the shear structure is supported by means of a single vertical post 26, which post is attached to these gibs 22, 24 in a well known manner. As so constructed and arranged the entire generally rectangular shear structure can be pivoted about the vertical axis of the post 26, and can also be vertically adjusted with respect to the feeder bowl as required in a particular installation. The shear structure is hydraulically operated in a manner to be described below, and a hydraulic manifold system including a reservoir is provided in the enclosure 28 for operation of component devices.

The shear structure includes a generally rectangular frame 132, which frame includes left and right-hand end portions or bulkheads held in fixed relationship to one another by a pair of bottom rails 30, 30 and it is noted that the manifold 28 (not shown in FIG. 1) is mounted to the right-hand bulkhead 32 of this fixed portion or frame 132 of the shear structure. Still with reference to the fixed portion of the shear structure, upper guide rails 154 and 154a extend across and between the left and right-hand bulkheads of the fixed shear structure to slidably support an upper generally U-shaped frame 150, while a lower set of fixed guide rails 164 and 164a are spaced below the upper rails 154 and 154a so as to slidably support an oppositely arranged U-shaped frame 160. Both the upper and lower U-shaped frames 150 and 160 include leg portions which are slidably supported on their respective guide rails. For example, the upper frame 150 includes legs 152 and 155 slidably supported on rails 154 and 154a whereas the lower U-shaped frame 160 includes leg portions 162 and 165 on rails 164 and 164a. Each of these U-shaped frames comprises a carriage which can be moved from and to the position shown for it in the drawings by means of the hydraulic system depicted schematically in FIG. 6.

Prior to discussing the mechanism for moving these carriages it should be noted that the ends of the legs of these U-shaped carriages support shear blades which are adapted to reciprocate with the carriages in such a way that these blades move past one another, and do so not only on the forward stroke of each such carriage, but also on the return stroke. These carriages are adapted to move oppositely to one another under the control of the hydraulic system depicted schematically in FIG. 6. Preferably, and as shown in FIGS. 1 and 3 the lower carriage 160 has an associated fluid motor or actuator, the fixed part of which comprises a piston 163 mounted on the guide rod 164. The upper carriage 150 has a fixed piston 153 mounted to the upper guide rod 154. The guide rods themselves are actually hollow tubes which carry fluid under pressure to one or the other side of these pistons for so operating these actuators. The movable portions of each of these actuators or fluid motors comprise cylindrical portions slidably mounted on these pistons and defining the legs of their respective U-shaped carriages 150 and 160.

Figure 5:
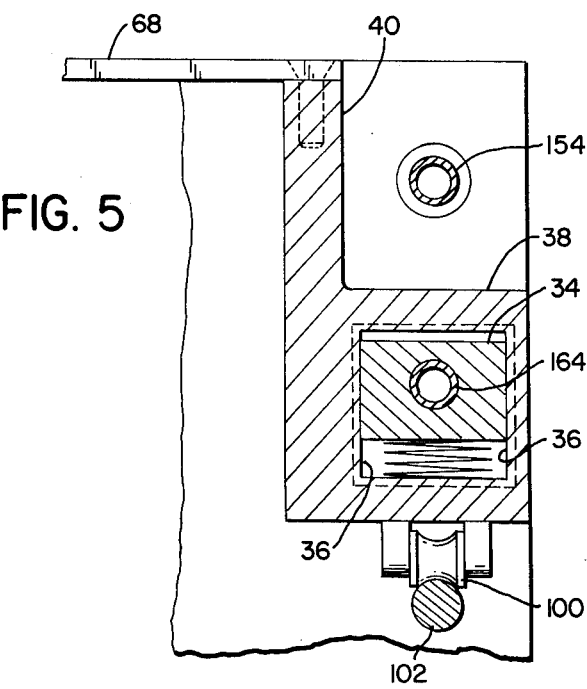
FIG. 5 is an enlarged sectional view taken generally on the line 5—5 of FIG. 3.

Turning next to a detailed description of the shear blades themselves, FIG. 1 shows the upper U-shaped carriage 150 and more particularly the leg portions 52 and 55 as carrying an upper shear blade 58 which extends across and between these legs, and which is mounted to the forward ends of these legs by suitable screw means or the like. As best shown in FIG. 5 the lower U-shaped carriage 160, and more particularly each of its leg portions 162 and 165, carries a rectangular block 34, which block is vertically movable in a slot provided for this purpose in an L-shaped member 38. These blocks 34, 34 are adapted to move the L-shaped members 38, 38 linearly with respect to the guide rail 164 as a result of keyways 36, 36 provided for this purpose in a rectangular opening defined for this purpose in the members 38, 38. Each L-shaped member 38 includes a vertically upwardly extending leg portion 40 which supports one of two double edged blades 68, 68 associated with the lower carriage 160.

The configuration just described provides a convenient means for adjusting, vertically, the spacing between the pass through shear blades 58 and 68, by means of a barrel shaped roller 100 provided for this purpose at the lower side of the L-shaped member 38 and riding on a rail 102. The rail 102 can be adjusted vertically to vary the height of the member 38 and consequently the height of the lower shear blades 68 with respect to the upper blade 58. A crank 106 best shown in FIG. 1 is provided at the left-hand bulkhead of the fixed shear frame 132 for rotating a worm gear 108, which worm gear meshes with a pinion 112 rotatably mounted in the shear frame 132, and which gear 112 carries the shaft 102 in an eccentric fashion, as indicated generally at 104. Thus, rotation of the crank 106 will raise or lower the lower shear blades 68 for achieving this important adjustment.

Referring now more particularly to the geometric configuration of the shear blades 58 and 68, each such blade is supported in generally perpendicular relationship to an associated leg of one of the U-shaped carriages, and each such blade has a generally V-shaped leading cutting edge, 58a for example, as well as an oppositely directed generally V-shaped trailing cutting edge 58b. The cutting edge is of those blades 68, 68 associated with the lower carriage 160 are similarly configured except that each of the lower blades 68, 68 is independently mounted to its associated leg.

Figure 6:
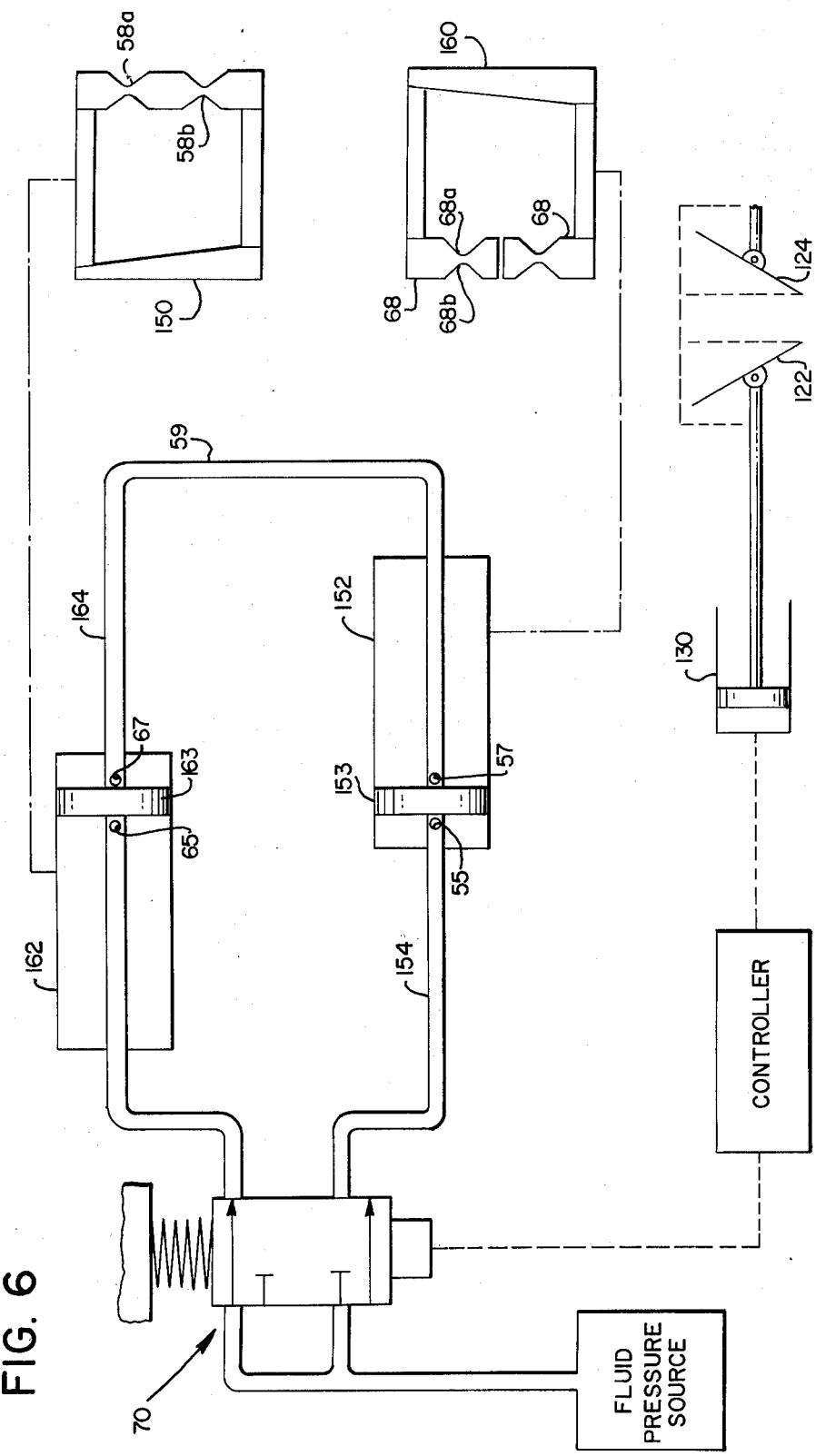
FIG. 6 is a schematic control and actuating system for the structure shown in the previous views.

Turning next to the hydraulic schematic view of FIG. 6, and to a description of the control means for operating the upper and lower actuators 152 and 162 associated with the upper and lower carriages 150 and 160, these carriages are depicted schematically in FIG. 6 in the same relative positions which these components occupy in FIGS. 1 and 3, namely at the limit of travel of the upper U-shaped carriage 150 in its left-hand or forward direction and at the limit of travel of the lower carriage 160 in its right-hand or rearward direction. A source of hydraulic fluid under pressure is indicated in FIG. 6 as making available fluid under pressure to a spool type control valve 70, which spool valve 70 is shifted from and to the position shown as a result of a pneumatic, or other signal from a controller. The controller is adapted to shift the spool valve from the position shown to an alternative position (not shown) and to thereby cut-off pressure to the actuator 162 and send pressure to the actuator 152. In the configuration shown fluid under pressure is fed to the port 65 in the line or guide rail 164 so as to hold the actuator 162 in the position shown. When the spool valve 70 is shifted to its alternative position, fluid pressure is instead directed through port 55 to move the actuator 152 from the position shown to its alternative position and to thereby force fluid through port 57 and through cross feed line 59, and through port 67 moving the actuator 162 to its alternative position. This configuration assures that one cylinder moves in opposition to the other. It will, of course, be understood that the schematic representation of FIG. 6 is somewhat simplified from the hydraulic control system as shown and described in my prior issued U.S. Pat. No. 3,435,719. It will further be understood that other arrangements might also be conceived for accomplishing the reciprocating motion of these actuators in opposition to one another. So long as these carriages 150 and 160 move in opposite directions under the control of a controller or the like, severed gobs of glass are sequentially delivered to the molds of a glassware forming machine taking advantage of the invention disclosed herein. Conventional practice utilizes a signal from the feeder itself to time both the gob forming plunger, and also to provide a sequencing signal to the glassware forming machine. However, it will be apparent that other approaches to timing the molten glass shears of the present invention might also be devised within the scope of the present invention.

Figure 4:
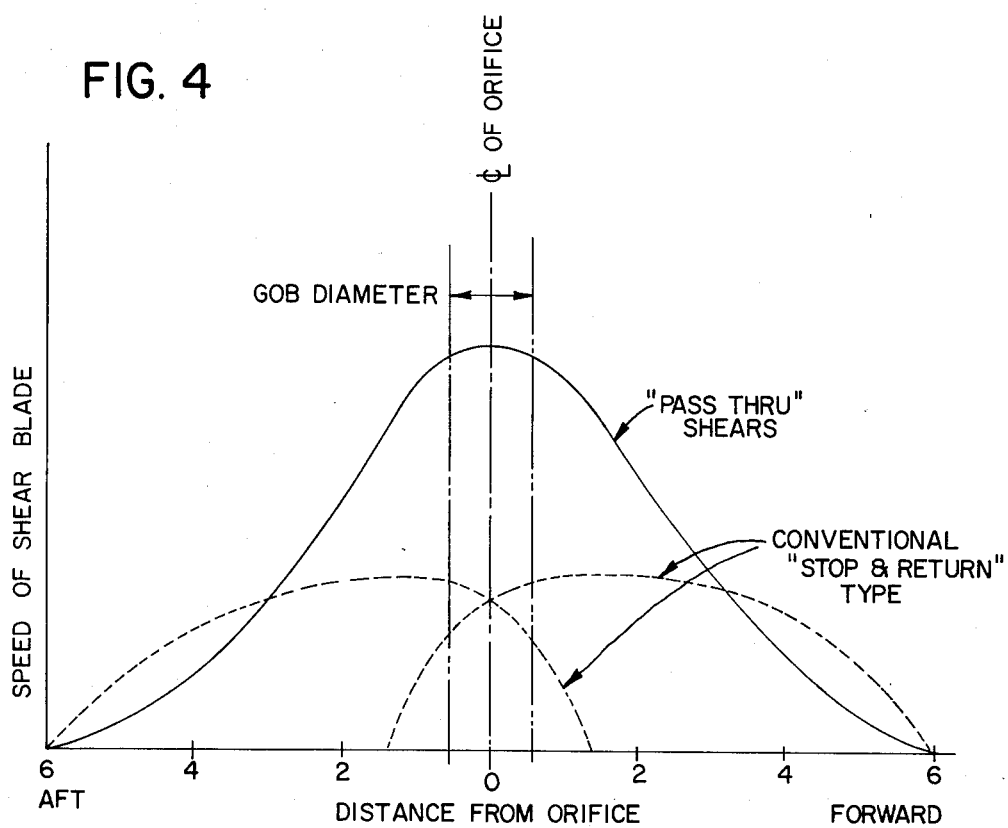
FIG. 4 is a graphical representation of the relationship between speed of the shear blades with respect to the distance of these blades, in inches, from the vertical center line of one orifice, along which line the molten glass stream is discharged from the feeder bowl. One set of curves in broken lines depicts this relationship for a conventional stop and return type shear blade structure, and the single solid line curve labeled "pass through shears" depicts the relationship between these parameters for the shear blades constructed in accordance with the present invention.

From the above description of the operation of this device it will be apparent that the shear blades 58 and 68 are adapted to move from the position shown in FIGS. 1 and 3 across the vertical center lines of the orifices 18 and 20 associated with the feeder bowl outlet spout, and hence across the streams of molten glass in such a manner that the leading edge 58b of the upper blade 58 cooperates with the leading edge 68a of the lower shear blades to sever the molten glass streams at least approximately at the center line of each of these orifices 18 and 20. FIG. 4 shows the center line of the orifice as a vertical reference line carrying the annotation zero on the horizontal coordinate of this graph. The bell-shaped curve which is labeled "pass through shears" depicts the relative speed of each of the shear blades 58 and 68 as these blades move across the center line of the orifices. The same curve is obtained both during the forward cutting motion associated with the opposite edges of these blades 58 and 68. The trailing edge 58a of the upper blade 58 cooperates with the trailing edge 68b of the lower blade to sever the glass stream when these carriages 150 and 160 move forwardly and rearwardly respectively. Each of these blades is at rest at its limit of travel, as indicated generally by the reference numerals 6, 6 on the graph of FIG. 4. The speed increases to a maximum at the midpoint of blade travel and subsequently decays to zero at the opposite limit of travel of that particular shear blade. Thus, the maximum speed occurs during the period of glass/blade contact. Also shown in FIG. 4, for reference purposes, is the relative speed profile of the pivoted stop and return type of shear blade used in prior art designs, such as shown for example in the Peiler U.S. Pat. No. 2,680,937. It will be apparent that the speed of the shear blades at the moment of cut is greatly improved, by a factor of two or more, as a result of adopting the pass through shear design shown and described in this disclosure. This result is attributable to the fact that the blade need not come to rest at a point close to the actual cutting of the molten glass stream. Prior art pivoted type "stop and return" shears must of necessity stop at their closed position, that is at a point approximately one to one and one-half inches from the zero reference line of FIG. 4, which line coincides with the vertical center line through the orifice of the feeder bowl. pass through shears of the type described herein need not be so limited, and the blades instead are designed to pass through this point to a rest position where they are ready for a succeeding cut. The pass through design is more efficient because it makes use of the return motion to cut glass rather than to waste this return motion. The shear blades themselves are different in design from those shown in the prior art in that cutting edges are provided on both the leading and trailing edges thereof.

In further accordance with the present invention drop guide means is provided for guiding the newly formed gob of glass as it drops downwardly from the shears to the gob distribution system or glassware forming machine. FIG. 1 shows a preferred form of drop guide means indicated generally at 120. Although it is well known that the gob is usually deflected to the side associated with the motion of the shear blade it will be apparent that the lower shear blade of a pass through shear design necessarily operates in both direction, and as a result the drop guide means 120 provides for guiding the gob regardless of the direction of motion of the lower shear blade. This clamshell type of drop guide includes mating half sections 122 and 124 each of which sections is pivotally supported on an associated rock shaft 126 and 128 respectively. The axes 126a and 128a respectively of these shafts 126 and 128 are displaced horizontally the one from the other, and means is provided for oscillating these shafts in opposite directions to open and close the clamshells in timed relationship to the shearing action of the blades. As best shown in the schematic system of FIG. 6, said means comprises an actuator 130 driven by the same controller which operates the valve 70. As a result, the clamshell sections 122 and 124 are opened and closed in timed relationship with components of the feeder, and also in timed relationship with the glassware forming machine itself.

I claim:
1. Apparatus for use beneath the outlet spout of a molten glass feeder of the type adapted to form one or more vertical streams of molten glass to be severed, said apparatus comprising:
   a. a pair of horizontally opposed double edged shear blades, each of which blades has a leading cutting edge and a trailing cutting edge on the opposite side thereof,
   b. a horizontally reciprocal carriage for each of said blades, each of said carriages being movable in a forward direction and also a rearward direction, each carriage having a U-shape with the shear blades supported on the legs of the U and the base of each U being horizontally spaced from said blades so that only the blades pass through the molten glass stream,
   c. a shear structure adapted to be mounted to the feeder bowl and having upper and lower sets of guide rails for slidably supporting said carriage legs, the lower carriage legs including spacer means for the lower shear blades whereby the lower and upper shear blades move in closely spaced horizontal paths immediately below the feeder bowl outlet spout,
   d. means for reciprocating said carriages in opposite directions so that the leading edge of one blade cooperates with the leading edge of the other blade to sever the molten glass streams generally during the midpoints of the movement of said carriages and so that movement of said carriages in their opposite directions respectively causes the trailing edge of said one blade and trailing edge of said other blade to sever the molten glass stream generally during the midpoint of movement of said carriages.

2. Apparatus according to claim 1 wherein said means for reciprocating said U-shaped carriages includes at least one linear fluid actuator associated with each carriage, said means further including control valve means for selectively conveying fluid under pressure to one and then the other of said fluid actuators and so that they move instantaneously and oppositely to one another.

3. Apparatus according to claim 2 further comprising drop guide means below the horizontally reciprocable shear blades for guiding the newly formed gob as it is being sheared, and drop guide means including clamshell half sections, and actuator means for moving said clamshell sections toward and away from one another, and controller means for said shear blade actuators and said clamshell actuator means to move said clamshell sections into engagement with one another as said shear blades approach one another to sever the molten glass.

4. Apparatus according to claim 2 further including means for adjusting the vertical position of said upper and lower carriage mounted shear blades with respect to one another.

5. Apparatus according to claim 4 wherein said means for adjusting said shear blades includes a support member for each of said lower blades, said support member being slidable vertically on the legs of its associated U-shaped carriage and means for urging said blade support member upwardly.

6. Apparatus according to claim 5 wherein said means for adjusting said shear blades vertically with respect to one another further includes a pair of elongated eccentric shafts supported adjacent their ends in the rectangular shear structure, and means for rotating said eccentric shafts so as to raise or lower said blade support members.

7. Apparatus according to claim 6 wherein said means for adjustably mounting said blades vertically with respect to one another further includes a roller carried at the lower surface of said blade support member said roller riding on said eccentrically mounted adjustment shaft.

* * * * *

UNITED STATES PATENT OFFICE
CERTIFICATE OF CORRECTION

Patent No. 3,996,037            Dated December 7, 1976

Inventor(x) Frederick Joseph Wythe

It is certified that error appears in the above-identified patent and that said Letters Patent are hereby corrected as shown below:

Col. 1, line 61, "a a portion" should be --a portion--.

Col. 2, line 10, "stop and return type" should be in quotes.

Col. 3, line 38, "52" should be --152--.

Col. 3, line 39, "55" should be --155--.

Col. 5, line 26, "stop and return type" should be in quotes.

Col. 5, line 31, "pass through" should be in quotes.

Col. 5, line 38, "zero" should be quotes.

Col. 5, line 40, ". pass through" should be --. "Pass through"--.

Col. 5, line 44, "pass through" should be in quotes.

Col. 6, line 57, "and drop" should be --said drop--.

Signed and Sealed this

Twenty-second Day of March 1977

[SEAL]

Attest:

RUTH C. MASON
*Attesting Officer*

C. MARSHALL DANN
*Commissioner of Patents and Trademarks*